United States Patent
Yuansheng et al.

[11] Patent Number: 6,004,454
[45] Date of Patent: Dec. 21, 1999

[54] HYDROCRACKING OF HEAVY OIL AND RESIDUUM WITH A DISPERSING-TYPE CATALYST

[75] Inventors: Li Yuansheng; Wang Jun; Jiang Lijing; Zhang Zhongqing; Liu Jiduan; Ren Shuyan; Zhao Bo; Jia Yongzhong, all of Fushun, China

[73] Assignees: China Petro-Chemical Corporation; Fushun Research Institute of Petroleum and Petrochemicals, SINOPEC, both of China

[21] Appl. No.: 09/204,050

[22] Filed: Dec. 2, 1998

Related U.S. Application Data

[62] Division of application No. 08/754,877, Nov. 22, 1996, Pat. No. 5,948,721.

[30] Foreign Application Priority Data

Nov. 22, 1995 [CN] China ................................ 95118354
Apr. 16, 1996 [CN] China ................................ 96102879

[51] Int. Cl.$^6$ .................................................. C10G 47/02
[52] U.S. Cl. .................. 208/111.3; 208/108; 208/111.35; 208/114; 208/153
[58] Field of Search ........................... 208/111.3, 111.35, 208/108, 114, 153

[56] References Cited

U.S. PATENT DOCUMENTS

| | | | |
|---|---|---|---|
| 3,232,887 | 2/1966 | Pessimisis | 502/74 |
| 3,287,280 | 11/1966 | Colgan et al. | 502/211 |
| 3,840,472 | 10/1974 | Colgan et al. | 502/174 |
| 4,255,282 | 3/1981 | Simpson | 502/211 |
| 4,588,706 | 5/1986 | Kukes et al. | 502/211 |
| 4,637,871 | 1/1987 | Bearden, Jr. et al. | 208/112 |
| 4,740,295 | 4/1988 | Bearden, Jr. et al. | 208/421 |
| 4,954,473 | 9/1990 | Gatsis | 502/171 |
| 5,039,392 | 8/1991 | Bearden, Jr. et al. | 208/112 |
| 5,162,281 | 11/1992 | Kamo et al. | 502/168 |
| 5,171,727 | 12/1992 | Gatsis | 502/173 |
| 5,288,681 | 2/1994 | Gatsis | 502/152 |
| 5,474,977 | 12/1995 | Gatsis | 502/172 |
| 5,948,721 | 9/1999 | Yuansheng et al. | 502/211 |

FOREIGN PATENT DOCUMENTS 1035836   9/1989   China.

*Primary Examiner*—Walter D. Griffin
*Assistant Examiner*—Nadine Preisch
*Attorney, Agent, or Firm*—Pennie & Edmonds LLP

[57] ABSTRACT

This invention discloses a dispersing-type catalyst for catalytic hydrocracking of heavy oil and residuum, the preparation method thereof and a suspension bed hydrocracking process for hydrocracking of heavy oil and residuum using said catalyst. Said catalyst comprises 2 to 15 wt % Mo, 0.1 to 2 wt % Ni and 0.1–3 wt % P. The preparation method comprises dissolving oxides or salts of metals such as Mo, Ni in water. The process comprises mixing the heavy oil and residuum feedstock with the catalyst, heating the mixture and introducing the mixture into a suspension bed reactor, performing the hydrocracking reaction at 380–460° C. under 10–15 MPa of hydrogen pressure, in which the catalyst is added in an amount to provide 150–150O ppm active metals. The yield of light oil according to the process is more than 70 wt %, substantially without coking.

8 Claims, 1 Drawing Sheet ic acid as catalyst In this process, the aqueous solution of phosphomolybdic acid must comprise less than 5 wt % molybdenum. If the content is higher than 5 wt %, coking will remarkably increase. The speed and degree of hydrogenation reaction depend on the concentration of active metals in the reaction system. If an aqueous solution of phosphomolybdic acid having low concentration is used, a lot of water will be introduced into the catalyst-oil system in order to reach a proper concentration of active metals in the reaction system.

HYDROCRACKING OF HEAVY OIL AND RESIDUUM WITH A DISPERSING-TYPE CATALYST

This is a division of application Ser. No. 08/754,877 filed on Nov. 22, 1996, now U.S. Pat. No. 5,948,721.

FIELD OF THE INVENTION

The present invention relates to a dispersing-type catalyst for catalytic hydrocracking of heavy oil and residuum, a method for preparing the same and the use thereof in catalytic hydrocracking of heavy oil and residuum.

BACKGROUND OF THE INVENTION

Hydroconversion process of heavy oil and residuum is one of the main processes for converting a heavy hydrocarbonaceous feedstock to lower boiling products. Generally heterogeneous catalyst, such as alumina or silica-alumina supported sulfide of cobalt, molybdenum or nickel, is used in the process. The constituents having higher molecular weight in heavy oil and residuum deposit on the surface of the catalyst, block the pores of the catalyst, and then result in rapid decline of the hydrogenation activity. Eventually coke and metal impurities removed from heavy oil and residuum deposit on the surface of the catalyst and result in deactivation of the catalyst. Moreover, the rapid increase in pressure drop of the bed layer makes it difficult to maintain normal operation, which becomes more serious when the feedstock contains higher metal and carbon residue, thereby, the catalyst displays short service life and bad operation stability, therefore shut-down is more frequent.

In order to solve these problems, many dispersing-type catalyst have been proposed. Chinese Patent Application CN 1035836A discloses a dispersing-type catalyst and its preparation method, wherein iron compound (especially ferrous sulfate) is ground with coal powder in oil to form an iron-coal slurried catalyst. Subsequently, the catalyst is mixed with heavy oil to form feedstock for hydrogenation reaction.

The catalyst can be substantially dispersed into heavy oil. However, metal iron has only a little hydrogenation activity and coking is serious in the reaction process. Otherwise, the coal added as catalyst becomes coking support in the process, resulting in a lot of oil-insoluble solids in the product, thus, it brings much difficulty in separation and after-treatment, besides, the solid particles also wear the pipes and device.

U.S. Pat. No. 4,637,870 discloses a hydroconversion process, wherein phosphoric acid is added to an aqueous solution of phosphomolybdic acid. The phosphoric acid-phosphomolybdic acid aqueous solution is mixed with a hydrocarbonaceous material to form a catalyst precursor concentrate. The precursor concentrate is dehydrated, vulcanized, then mixed with heavy oil and residuum feedstock and introduced into a reactor to perform hydrogenation reaction. In the patent, it is mentioned that commercially available phosphomolybdic acid typically contains an atomic ratio of P/Mo ranging from about 0.08:1 to 0.01:1. If the phosphoric acid is added to the phosphomolybdic acid in an amount to provide an atomic ratio of P/Mo in the solution ranging from 0.12:1 to 0.45:1, coking can be obviously decreased (as shown in the examples, from 5.06% to 1.78%). In practice, however, this level of coking is still too high. Moreover, it is very inconvenient to premix the catalyst with hydrocarbonaceous material and predehydrate the catalyst before introducing it into a reactor in practical operation.

U.S. Pat. No. 4,637,871 discloses a hydroversion process utilizing an aqueous solution of phosphomolybdic acid as catalyst In this process, the aqueous solution of phosphomolybdic acid must comprise less than 5 wt % molybdenum. If the content is higher than 5 wt %, coking will remarkably increase. The speed and degree of hydrogenation reaction depend on the concentration of active metals in the reaction system. If an aqueous solution of phosphomolybdic acid having low concentration is used, a lot of water will be introduced into the catalyst-oil system in order to reach a proper concentration of active metals in the reaction system.

U.S. Pat. No. 5,039,392 discloses another modified process on the basis of the two patent process mentioned above, in which element sulfur is used as a vulcanizing agent to vulcanize the catalyst precursor concentrate, in order to simplify the preparation of the precursor concentrate. But, the following steps are still necessary: dispersing the aqueous solution of the catalyst into hydrocarbonaceous material, dehydrating, vulcanzing, adding it into feedstock and introducing into a reactor to perform the reaction. It is mentioned in the description that the amount of catalyst used is in the range of 50 to 300 ppm, however, an amount of 208 ppm is used in every example. In all examples, coke yields (solid product yield) are about 2.0 wt %, at least 1.8 wt %. Obviously, it is too high to be acceptable in practical operation.

High coke yield is a common problem in other similar techniques. therefore, it is necessary to propose a new technique to further lower the coke yield in catalytic hydrogenation of heavy oil and residuum.

In order to overcome these problems, the inventors have concentrated their research on the development of a catalyst which can further decrease the coke yield in catalytic hydrocracking of heavy oil and residuum, and has no disadvantagous effect on producing lower boiling products in the hydrocracking reaction.

SUMMARY OF THE INVENTION

The object of the present invention is to provide a dispersing-type catalyst for catalytic hydrocracking of heavy oil and residuum, which comprises 2 to 15 wt % Mo, 0.1 to 2 wt % Ni and 0.1 to 3 wt % P.

Another object of the present invention is to provide a method for preparing said dispersing-type catalyst, which comprises dissolving oxides or salts of transition metals such as Mo, Ni in water to form an aqueous solution.

Still another object of the present invention is to provide a suspension bed catalytic hydrocracking process for heavy oil and residuum, which comprises mixing heavy oil and residuum feedstock with the catalyst according to the present invention, heating the mixture, introducing the mixture into a suspension bed reactor, and performing the hydrocracking reaction at 380–460° C. under 10–15 MPa of hydrogen pressure, in which the catalyst is added in an amount to provide from 150 to 1500 ppm active metals.

DETAILED DESCRIPTION OF THE INVENTION

Figure 1:
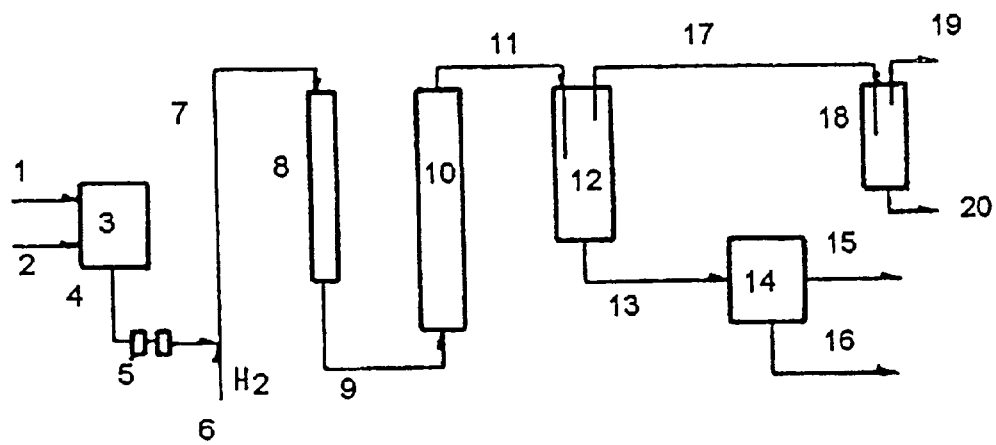
FIG. 1 is a flow chart of one embodiment of the catalytic hydrocracking process of the present invention for heavy oil and residuum.

The catalyst provided by the present invention for catalytic hydrocracking of heavy oil and residuum is an aqueous solution, which can uniformly disperse into heavy oil and residuum feedstock and form an emulsion. Element nickel is introduced into Mo/P system in the catalyst of the present invention so as to increases hydrogenation activity of the catalyst and effectively decrease coking in the reaction process. The concentration of molybdenum in the catalyst of the present invention may be higher than 5 wt %, unlike the prior art disclosed in U.S. Pat. No. 4,637,871 (less than 5 wt %), without resulting in the increase of coking in the reaction process. This is accomplished by introducing nickel and then adjusting the composition of water-soluble catalyst. Increasing the contents of active metals in the catalyst would lower the cost of equipment and operation and reduce the quantity of waste.

In accordance with the invention, the dispersing-type catalyst for catalytic hydrocracking of heavy oil and residuum comprises 2 to 15 wt % Mo, 0.1 to 2 wt % Ni and 0.1 to 3 wt % P. The catalyst may comprise other elements, provided that they have no reverse effect on the property of the catalyst.

Preferably, the catalyst comprises 5 to 10 wt % Mo, 0.1 to 1.0 wt % Ni and 0.2 to 1 wt % P.

Most preferably, the catalyst comprises 6 to 8 wt % Mo, 0.3 to 0.8 wt % Ni and 0.2 to 0.4 wt % P.

The catalyst of the present invention can be prepared by dissolving the compounds or salts of transition metals such as Mo, Ni in water.

Preferably, the catalyst can be prepared by dissolving the oxides or salts of said metals in an aqueous solution of an acid.

The said acid may be common acids used in the art, and phosphoric acid is preferred.

The oxides or salts of Mo and Ni may be, for example, molybdenum oxide, phosphomolybdic acid, nickel carbonate, nickel oxide and the like, among which molybdenum oxide, phosphomolybdic acid, nickel carbonate or nickel acetate is preferred, molybdenum oxide and basic nickel carbonate are more preferred.

The method for preparing the catalyst of the present invention, for example, may comprise: adding a predetermined amount of phosphomolybdic acid and nickel nitrate to water in proper amounts, and dissolving them completely, optionally by heating to accelerate the dissolution, to obtain an aqueous catalyst solution; or adding a predetermined amount of molybdenum oxide and basic nickel carbonate to aqueous phosphoric acid solution which contains 0.2–3 wt % P, and dissolving them completely, optionally by heating to accelerate the dissolution, to obtain an aqueous catalyst solution.

As mentioned above, the catalyst of the present invention can be used in catalytic hydrocracking of heavy oil and residuum, and an unpredicted and remarkable effect can be achieved. According to the suspension bed catalytic hydrocracking process of the present invention, the catalyst can be highly dispersed into heavy oil and residuum, and then the hydrocracking reaction can be performed in a reactor which has no fixed catalyst bed. The method can convert a large quantity of heavy oil and residuum into lower boiling fractions. The adding of the catalyst and control of the reaction are facilitated in operation, and the desired yield of conversion to lower boiling products is fulfilled and the coke yield in the reaction process can be lowered to less than 1.0%, or even less than that Moreover, according the process of the present invention, desirable products can be obtained to meet the market demand or meet the requirement of upstream and/or downstream flows, by adjusting the metal concentrations, element ratios in the catalyst and other reaction conditions to achieve the desired distribution of products in the cracker unit, in which a major amount of the products have the desired boiling range.

According to the process of the present invention, the catalyst is added into heavy oil and residuum feedstock conventionally and economically to carry out the hydrocracking reaction in a reactor.

The process of the present invention comprises mixing the catalyst of the present invention with a heavy oil and residuum feedstock, heating the mixture, introducing the mixture into a suspension bed reactor and performing the hydrocracking reaction at 380–460° C. under 10–15 MPa of hydrogen pressure; wherein the catalyst is added in an amount to provide from 150 to 1500 ppm active metals.

In one embodiment of the hydrocracking process of the present invention, heavy oil and residuum feedstock is mixed directly with the catalyst, and then the resulting mixture is introduced into the reaction zone to perform hydrocracking reaction. There is no need to prepare a catalyst precursor.

In another embodiment of the hydrocracking process of the present invention, the feedstock which is cold is mixed directly with the catalyst, then mixed with hydrogen, the resulting mixture is heated in a heating oven and then enters the reactor.

In still another embodiment of the hydrocracking process of the present invention, the feedstock having higher temperature comes from upstream device, and the catalyst is injected into hot oil line by a pump via a distributor, subsequently, the resulting mixture is introduced into the reaction system.

In still another embodiment of the hydrocracking process of the present invention, when the feedstock is about 100° C. and has high viscosity, not suitable for mixing with the catalyst directly, the catalyst is first premixed with a small amount of heavy oil and residuum having low viscosity, and then mixed with the feedstock having high viscosity, or added into heavy oil and residuum feedstock having high viscosity by a distributor.

In order to meet the market demand or the requirement of product distribution in the device, desirable products can be obtained by adjusting the contents of metal Mo, Ni and element P in the catalyst and other reaction conditions.

The catalyst used in the hydrocracking process of the present invention for a heavy oil and residuum feedstock is the catalyst of the present invention.

In the heavy oil and residuum hydrocracking process of the present invention, the catalyst is added in an amount to provide preferably 200–1000 ppm active metals.

The hydrocracking process of the present invention will be described in more detail below referring to the figures. It must be understood that the present invention is not limited to the embodiments described below in any way, which only describe the process of the present invention.

Referring to FIG. 1, a heavy oil and residuum feedstock and the catalyst are introduced separately by lines 1 and 2 into mixing device 3. Said mixing device 3 is a stirring tank, colloid mill, static mixer or the like. The feedstock and the catalyst are mixed uniformly in the mixing device. If the viscosity of the feedstock is so high that it is difficult to mix by common method at a temperature below 100° C., the catalyst may first be mixed with a small amount of heavy oil and residuum at normal pressure and then mixed with the feedstock having high viscosity. The mixed feedstock is passed by line 4, pump 5 and line 7 to heater 8. Hydrogen is introduced into the system by line 6. The feedstock is heated to 360–390° C. in heating oven 8, and then passed by line 9 to reactor 10. The operating conditions in the reactor are: Hydrogen pressure 10–18 MPa, hourly space velocity of feedstock liquid 0.5–2 $h^{-1}$, reaction temperature 390–460° C., hydrogen/oil ratio 500–1500 (volume ratio). The reaction products are passed by line 11 to high-pressure separator 12. The separated gases is passed by line 17 to gas recovery and separating system 18. Hydrogen is washed, purified and recycled to the reactor by line 19. Lighter oil is withdrawn by line 20. The liquid material separated from high-pressure separator 12 is passed by line 13 to a solid separation device 14. Solids can be separated by filtration or centrifugal separator. The liquid product from which catalyst powder and coke formed have been removed is withdrawn by line 16. The filtrated solid material may be recycled to a reactor or metal recycling system.

Figure 2:
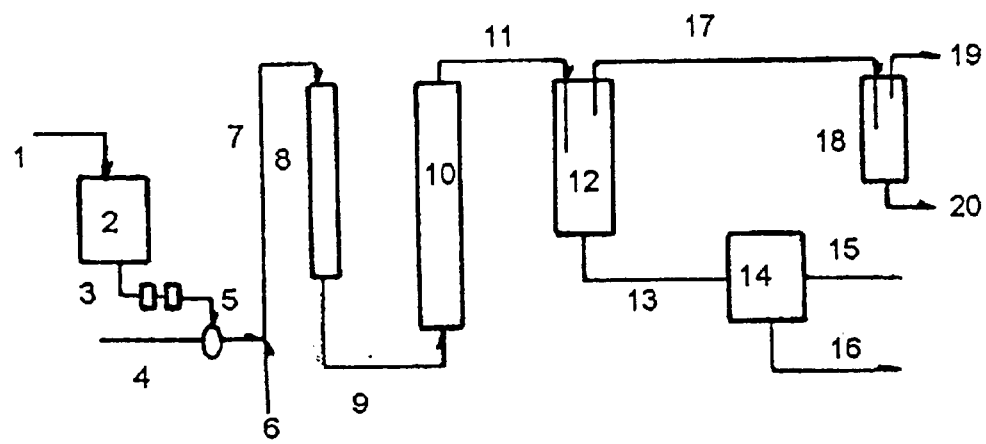
FIG. 2 is a flow chart of one embodiment of catalytic hydrocracking process of the present invention for heavy oil and residuum, in which the temperature of the feedstock is very high.

When the temperature of feedstock is high (for example the heavy oil and residuum comes from upstream device) and not suitable for mixing with aqueous solution before charging, it is very difficult to mix the feedstock with the catalyst before entering the system. According to the present invention, the catalyst is injected directly into feedstock line, as shown in FIG. 2. The hot heavy oil and residuum comes from upstream device via line 4. The catalyst is injected by pump 3 via a distributor 5 into the heavy oil and residuum, and mixed with the heavy oil and residuum while flowing. High pressure hydrogen is introduced by line 6 into heavy oil and residuum. The mixture is passed by line 7 into heater 8. The mixture which has been heated to reaction temperature is introduced into reactor 10 by line 9. The hydrogenation reaction is performed at 380–460° C. under 8–17 MPa. The reaction product is passed by line 11 to high-pressure separator 12, the gases separated are passed by line 17 to gas recovery and separating system 18. Hydrogen is washed, purified and recycled to the reactor by line 19. Lighter oil is withdrawn by line 20. The liquid material separated from high-pressure separator 12 is passed by line 13 to a solid separation device 14. Solids can be separated by a filtration or centrifugal separator. The liquid product from which the catalyst powder and coke formed have been removed is withdrawn by line 16. The solid material filtrated may be recycled to a reactor or metal recycling system.

If sulfur content in the heavy oil and residuum feedstock is not particularly high (for example, below 2.0 wt %) the prevulcanizing step using vulcanizing agent can be omitted. Generally, the sulfur content of heavy oil and residuum needed to be hydrogenated is higher than 2.0 wt %.

Compared with the prior art, the present invention has the following advantages:

(1) Element nickel introduced into P and Mo water-soluble catalyst system can effectively restrain coking;

(2) The distribution of products may be controlled by adjusting the Mo/Ni atomic ratio in the catalyst in the reaction, thereby the product scheme can be changed flexibly to meet the market demand and the requirement of upstream and downstream flows;

(3) The total metal concentration in the aqueous solution may be up to 16 wt %. When the amount of metals added in the catalyst is constant, less water is introduced into feedstock, therefore, the dehydration step, a very difficult step, may be omitted, while coke yield can be controlled below 1.0 wt %;

(4) The prevulcanizing step using vulcanizing agent may be omitted.

EXAMPLES

Examples 1–8

These tests are to examine the effect of added nickel on hydrogenation process of heavy oil and residuum.

To a vessel, metered amounts of commercial molybdenum oxide (or phosphomolybdic acid), phosphoric acid, and basic nickel carbonate were added, then a proper amount of deionized water was added, the mixture was refluxed for 2 hours, there obtained was an aqueous catalyst solution containing Mo, Ni and P, the contents of which are shown in Table 1, wherein molybdenum oxide was replaced by phosphomolybdic acid in examples 2, 5 and 7.

A 750 ml high pressure reactor equipped with a stirrer was charged with 250 g of Gudao Vacuum residuum (obtained from Shengli Refinary, CHINA), then an amount of the catalyst, the compositions of which are shown in Table 1, was added to provide a total amount of 200 ppm metals, based on the amount of heavy oil and residuum feedstock. The reactor was sealed, flushed with hydrogen, fed with hydrogen to 7 MPa of hydrogen pressure at room temperature, heated with stirring at 440° C. for 1 hour. The reaction product was analyzed for coke yield, yield of fraction below 350° C. (AGO) and yield of fraction between 350–500° C. (VGO), the results are shown in Table 1.

TABLE 1

Effects of catalyst in which Mo, Ni and P are in variant ratios on catalyst performance in hydrocracking test

| Examples | 1 | 2 | 3 | 4 | 5 | 6 | 7 | 8 |
|---|---|---|---|---|---|---|---|---|
| Mo (wt %) | 5.6 | 5.6 | 5.6 | 10 | 10 | 10 | 10 | 10 |
| Ni (wt %) | 0 | 0.2 | 0.4 | 0 | 0.6 | 0.8 | 0.9 | 1.0 |
| P/Mo | 0.15 | 0.15 | 0.15 | 0.087 | 0.087 | 0.10 | 0.087 | 0.087 |
| Coke yield (wt %) | 1.69 | 0.67 | 0.10 | 8.27 | 4.65 | 3.11 | 1.18 | 0.50 |
| AGO (wt %) | 32.69 | 32.60 | 32.54 | 45.54 | 42.29 | 41.21 | 40.16 | 40..13 |
| VGO (wt %) | 31.34 | 31.95 | 32.34 | 25.66 | 29.33 | 30.55 | 31.22 | 31.78 |

The results of the tests illustrate that the catalyst in which nickel has been added can effectively decrease coke yield in the process. In addition, even when P/Mo atomic ratio is only 0.087 (P/Mo atomic ratio is 0.087–0.10 in commercial phosphomolybdic acid) and content of Mo is up to 10 wt %, the coke yield can be controlled below 1 wt % in the process, if the nickel content is properly adjusted.

Examples 9–18

These tests show that the distribution of products may be adjusted in a large scope by properly adjusting the compositions of the catalyst and other reaction conditions. Thus, the process has high flexibility. The procedures were the same as the above examples except that different compositions of the catalyst and different reaction conditions were used. The results are shown in Table 2.

TABLE 2

| Examples | 9 | 10 | 11 | 12 | 13 | 14 | 15 | 16 | 17 | 18 |
|---|---|---|---|---|---|---|---|---|---|---|
| Compositions of the catalyst | | | | | | | | | | |
| Mo (wt %) | 5.6 | 4.0 | 4.9 | 4.9 | 3.5 | 2.0 | 8.0 | 6.4 | 6.6 | 7.0 |
| Ni (wt %) | 0.7 | 0.3 | 0.4 | 1 | 1 | 0.1 | 0.8 | 1.0 | 0.8 | 1.1 |
| P/Mo | 0.087 | 0.087 | 0.087 | 0.087 | 0.087 | 0.087 | 0.087 | 0.087 | 0.21 | 0.21 |
| Reaction conditions | | | | | | | | | | |
| Reaction temperature, °C. | 430 | 440 | 450 | 390 | 430 | 440 | 430 | 430 | 435 | 435 |
| Reaction time, h | 1 | 1 | 1 | 2 | 2 | 3 | 1 | 2 | 1 | 1 |
| Catalyst, ppm | 160 | 1450 | 250 | 300 | 250 | 427 | 250 | 250 | 300 | 300 |
| Results | | | | | | | | | | |
| Coke yield (wt %) | 0.02 | 0.446 | 0.94 | 0.03 | 0.27 | 0.98 | 0.1 | 0.67 | 0.08 | 0.02 |
| AGO (wt %) | 33.0 | 30.1 | 47.3 | 16.1 | 36.8 | 40.8 | 35.5 | 37.6 | 36.4 | 38.3 |
| VGO (wt %) | 31.2 | 36.3 | 28.0 | 18.0 | 43.9 | 45.1 | 29.9 | 39.6 | 38.1 | 39.2 |

It can be seen from the above examples that the distribution of products may be changed in a wide scope by adjusting the metal concentrations, element ratios in the catalyst and other reaction conditions. Light oil yield may be changed between 60% and 80%, and coke yield can be controlled at less than 1.0 wt %.

Examples 19–24

These examples show the suspension bed hydrocracking reaction of heavy oil and residuum in a continuous laboratory apparatus.

The continuous suspension bed laboratory apparatus for hydrocracking of heavy oil and residuum is shown in FIG. 1. Reffering to FIG. 1, a heavy oil and residuum feedstock and the catalyst aqueous solution were mixed in a mixing device 3. The mixed feedstock was passed by line 4, pump 5 and line 7 to heater 8. Hydrogen was introduced into the system by line 6. The feedstock was heated to 360–390° C. in a heating oven, and then passed by line 9 to reactor 10. The reaction products were passed by line 11 into high-pressure separator 12. The gases separated are passed by line 17 to gas recovery and separating system 18. Hydrogen was washed, purified and recycled to the reactor by line 19. Lighter oil was withdrawn by line 20. The liquid material separated from high-pressure separator was passed by line 13 to a solid separation device 14. The liquid product from which catalyst powder and few coke formed had been removed was withdrawn by line 16. The solid material filtrated may be recycled to a reactor or metal recycling system. The condition of operation and reaction results are shown in Table 3.

TABLE 3

| Examples | 19 | 20 | 21 | 22 | 23 | 24 |
|---|---|---|---|---|---|---|
| Compositions of catalyst | | | | | | |
| Mo (wt %) | 5.2 | 5.2 | 10.0 | 14.0 | 5.28 | 5.28 |
| Ni (wt %) | 0 | 0 | 0.8 | 1.0 | 0.4 | 0.4 |
| P/Mo | 0.087 | 0.087 | 0.087 | 0.087 | 0.087 | 0.087 |
| Reaction conditions | | | | | | |
| Reaction pressure (MPa) | 14 | 14 | 14 | 14 | 14 | 14 |
| Space velocity (h$^{-1}$) | 1 | 1 | 1 | 1 | 1 | 1 |
| Temperature (° C.) | 430 | 440 | 395 | 455 | 440 | 420 |
| The amount of metal added (ppm) | 450 | 450 | 400 | 400 | 450 | 400 |
| Coke yield (wt %) | 1.5 | 2.2 | 0.25 | 1.0 | 0.72 | 0.21 |
| AGO (wt %) | 31.5 | 34.1 | 20.1 | 37.1 | 36.0 | 33.2 |
| VGO (wt %) | 29.5 | 30.2 | 22.5 | 33.2 | 32.8 | 28.3 |

Examples 25–28

These examples show the results when the temperature of the feedstock is high and it is not suitable for mixing with the catalyst before charging. When the temperature of feedstock is high (for example the heavy oil and residuum directly comes from upstream device), it is very difficult to mix the catalyst with the feedstock before entering the system. In this case, the hydrocracking process of the present invention can be performed by injecting the catalyst directly into feedstock line, the flow chart of which is shown in FIG. 2.

Reffering to FIG. 2, the hot heavy oil and residuum coming from upstream apparatus was introduced by line 4. The catalyst aqueous solution was injected into residuum by pump 3 via a distributor. The heavy oil and residuum was mixed with the catalyst while flowing. High pressure hydrogen was introduced by line 6, mixed with heavy oil and residuum feedstock and was passed by line 7 to heater 8. The feedstock heated to reaction temperature was passed by line 9 into reactor 10. hydrogenation reaction was performed at 380–460° C. under 8–17 MPa. The reaction product was passed by line 11 to high-pressure separator 12. The following procedures were the same as that in examples 17–22. The results are shown in Table 4.

TABLE 4

| Examples | 25 | 26 | 27 | 28 |
| --- | --- | --- | --- | --- |
| Mo (wt %) | 5.2 | 5.28 | 10.0 | 10.0 |
| Ni (wt %) | 0 | 0.4 | 0.8 | 0.8 |
| P/Mo | 0.087 | 0.087 | 0.087 | 0.087 |
| Reaction conditions | | | | |
| Reaction pressure (MPa) | 14 | 14 | 14 | 14 |
| Space velocity ($h^{-1}$) | 1 | 1 | 1 | 1 |
| Temperature (° C.) | 430 | 440 | 410 | 440 |
| The amount of metal added (ppm) | 450 | 350 | 250 | 300 |
| Coke yield (wt %) | 1.6 | 0.57 | 0.30 | 0.49 |
| AGO (wt %) | 32.6 | 36.5 | 31.8 | 40.8 |
| VGO (wt %) | 31.7 | 33.2 | 34.6 | 31.9 |

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A suspension bed hydrocracking process for catalytic hydrocracking of heavy oil and residuum, comprising mixing a heavy oil and residuum feedstock with a catalyst, heating the resulting mixture and introducing it into a suspension bed reactor, and performing the hydrocracking reaction at a temperature of 380 to 460° C. under a hydrogen pressure of 10 to 15 MPa; wherein said catalyst is a dispersing-type, non-supported catalyst in the form of an aqueous solution, comprises 2 to 15 wt % Mo, 0.1 to 2 wt % Ni and 0.1 to 3 wt % P, and is added in an amount to provide 150–1500 ppm active metals.

2. The suspension bed hydrocracking process according to claim 1, wherein said catalyst comprises 5 to 10 wt % Mo, 0.1 to 1.0 wt % Ni and 0.2 to 1 wt % P.

3. The suspension bed hydrocracking process according to claim 1, wherein said catalyst comprises 6 to 8 wt % Mo, 0.3 to 0.8 wt % Ni and 0.2 to 0.4 wt % P.

4. The suspension bed hydrocracking process according to claim 1, wherein the heavy oil and residuum feedstock is mixed directly with the catalyst, and the resulting mixture is introduced into a reaction zone to perform the hydrocracking reaction.

5. The suspension bed hydrocracking process according to claim 1, wherein the feedstock is mixed directly with the catalyst, then mixed with the hydrogen, and the resulting mixture is heated in a heating oven and then enters the reactor.

6. The suspension bed hydrocracking process according to claim 1, wherein the feedstock comes from an upstream device and has a higher temperature, and the catalyst is injected into the hot oil line by a pump via a distributor, then the resulting mixture is introduced into the reaction system.

7. The suspension bed hydrocracking process according to claim 1, wherein the feedstock is about 100° C. and has such a high viscosity that it is not suitable for mixing with the catalyst directly, the catalyst is first premixed with a amount of heavy oil and residuum having low viscosity with respect to the feedstock, and then mixed with the feedstock having high viscosity, or added into the feedstock having high viscosity by a distributor.

8. The suspension bed by hydrocracking process according to claim 1, wherein the catalyst is added to provide 200 to 1000 ppm active metals.

* * * * *